(12) United States Patent
Bultmann et al.

(10) Patent No.: US 7,931,053 B2
(45) Date of Patent: Apr. 26, 2011

(54) SEALING DEVICE FOR A TANK ACCESS OPENING IN PARTICULAR FOR TANK FILLER PIPES ON MOTOR VEHICLES

(75) Inventors: Etzhard Bultmann, Wedemark (DE); Derk Ekenhorst, Westerkappeln (DE)

(73) Assignee: SMR Patents S.a.r.l., Luxembourg (LU)

( * ) Notice: Subject to any disclaimer, the term of this patent is extended or adjusted under 35 U.S.C. 154(b) by 1150 days.

(21) Appl. No.: 10/595,752

(22) PCT Filed: Nov. 12, 2004

(86) PCT No.: PCT/DE2004/002510
§ 371 (c)(1),
(2), (4) Date: Jan. 2, 2007

(87) PCT Pub. No.: WO2005/047041
PCT Pub. Date: May 26, 2005

(65) Prior Publication Data
US 2007/0215832 A1    Sep. 20, 2007

(30) Foreign Application Priority Data
Nov. 12, 2003   (DE) .................................. 103 52 767

(51) Int. Cl.
*B65B 1/04*         (2006.01)
(52) U.S. Cl. ................... 141/350; 141/349; 137/614.05; 251/149.6

(58) Field of Classification Search .............. 141/311 R, 141/348, 349, 350, 382; 137/614.02, 614.03, 137/614.05; 251/140, 149.1, 149.6, 14, 149.69
See application file for complete search history.

(56) References Cited

U.S. PATENT DOCUMENTS

| | | | | |
|---|---|---|---|---|
| 3,530,887 | A * | 9/1970 | Stratman | 137/614.05 |
| 3,538,950 | A * | 11/1970 | Porteners | 137/879 |
| 4,630,749 | A | 12/1986 | Armstrong et al. | |
| 4,840,206 | A * | 6/1989 | Hill et al. | 141/349 |
| 4,911,203 | A * | 3/1990 | Garms | 137/614.04 |
| 5,547,099 | A | 8/1996 | Chang et al. | |
| 2001/0040162 | A1 | 11/2001 | Stiegler et al. | |

FOREIGN PATENT DOCUMENTS

| | | |
|---|---|---|
| DE | 41 09 337 A1 | 10/1991 |
| DE | 42 39 572 A1 | 7/1994 |
| DE | 198 25 725 A1 | 1/2000 |
| DE | 203 09 799 U1 | 8/2004 |
| EP | 1 132 247 A1 | 9/2001 |

OTHER PUBLICATIONS

German Office Action of 103 52 767.2-25 dated Mar. 9, 2006.

* cited by examiner

*Primary Examiner* — Gregory L Huson
*Assistant Examiner* — Jason K Niesz
(74) *Attorney, Agent, or Firm* — Reising Ethington P.C.

(57) ABSTRACT

A sealing device for a tank access opening whereby the ball is arranged to be displaced within the tank access opening. On introduction of a fuel nozzle, the ball opens the tank access opening.

13 Claims, 2 Drawing Sheets

SEALING DEVICE FOR A TANK ACCESS OPENING IN PARTICULAR FOR TANK FILLER PIPES ON MOTOR VEHICLES

FIELD OF THE INVENTION

The invention relates to a sealing device for a tank access opening, in particular for tank filler necks in motor vehicles.

BACKGROUND OF INVENTION

In the state of the art, fuel tank filler necks are sealed by means of screw caps, which may be of lockable design. Such filler caps are unwieldy, can be mislaid and especially in the case of diesel-engined vehicles can lead to a vehicle user getting his or her hands dirtier when refueling the vehicle.

SUMMARY OF INVENTION

The present invention provides a sealing device for a tank access opening which can be manipulated comfortably whilst nevertheless ensuring a secure seal.

According to the invention a sealing device for a tank access opening has the features of claim 1, in which a ball is displaceably supported inside the tank access opening in such a way that on introduction of a fuel nozzle the ball opens the tank access opening. The internally supported ball renders a screw cap superfluous. The sealing by means of a ball moreover has a self-intensifying effect if an excess pressure prevails inside the fuel tank filler neck.

In a further development of the invention the ball is supported on a guideway, which is aligned at an acute angle to the direction of insertion of the fuel nozzle and hence to the longitudinal extent of the fuel tank filler neck. The alignment at an acute angle means that on introduction of the fuel nozzle into the fuel tank filler neck a lateral force component is exerted on the ball, so that the ball is pushed out of the direction of movement of the fuel nozzle.

In order to ensure precise guidance and exact application of the ball to the tank access opening, the ball is guided in a sleeve. The sleeve is designed so that the fuel nozzle can penetrate unimpeded into the fuel tank filler neck, that is to say there is a recess provided on the underside of the sleeve in the direction towards the fuel tank filler neck.

For secure and in particular gas-tight sealing of the access opening, a sealing ring, against which the ball rests in the sealing position, is arranged at the access opening. The seal preferably takes the form of an O-ring.

The ball diameter is preferably greater than the diameter of the tank access opening, in order to ensure a secure, positively locking closure of the tank access opening by the ball. The ball diameter is also advantageously greater than the diameter of the fuel nozzle, so that when the fuel nozzle is applied and a pressure is exerted the ball does not get caught in the fuel nozzle or become jammed by the latter.

In order to ensure an effective seal, the ball is acted upon by a force and in particular spring-loaded in the direction of the tank access opening, the spring preferably taking the form of a compression spring. Alternative devices for applying a force may be provided, for example by means of a weight or other force-storage devices arranged on a lever.

In order to retain the ball securely in the sealing position in the event of an accident or acceleration forces due to other causes, a counterweight, which is designed and arranged so that the tank access opening is not opened merely due to an acceleration movement in the absence of any compressive force applied by way of a fuel nozzle, is assigned to the ball.

For this purpose the counterweight is coupled to the ball by way of a lever or lever arrangement, a variation of the lever arms serving to reduce the necessary, absolute weight of the counterweight.

The sealing device advantageously takes the form of a pre-assembled module, which can be fixed to a fuel tank filler neck, so that this module merely has to be mounted on the fuel tank filler neck and fixed thereto in a gas-tight manner as part of the final assembly process.

BRIEF DESCRIPTION OF DRAWINGS

An exemplary embodiment of the invention will be explained in more detail below with reference to the drawings attached, in which.

DETAILED DESCRIPTION OF EMBODIMENTS OF THE INVENTION

Figure 1:
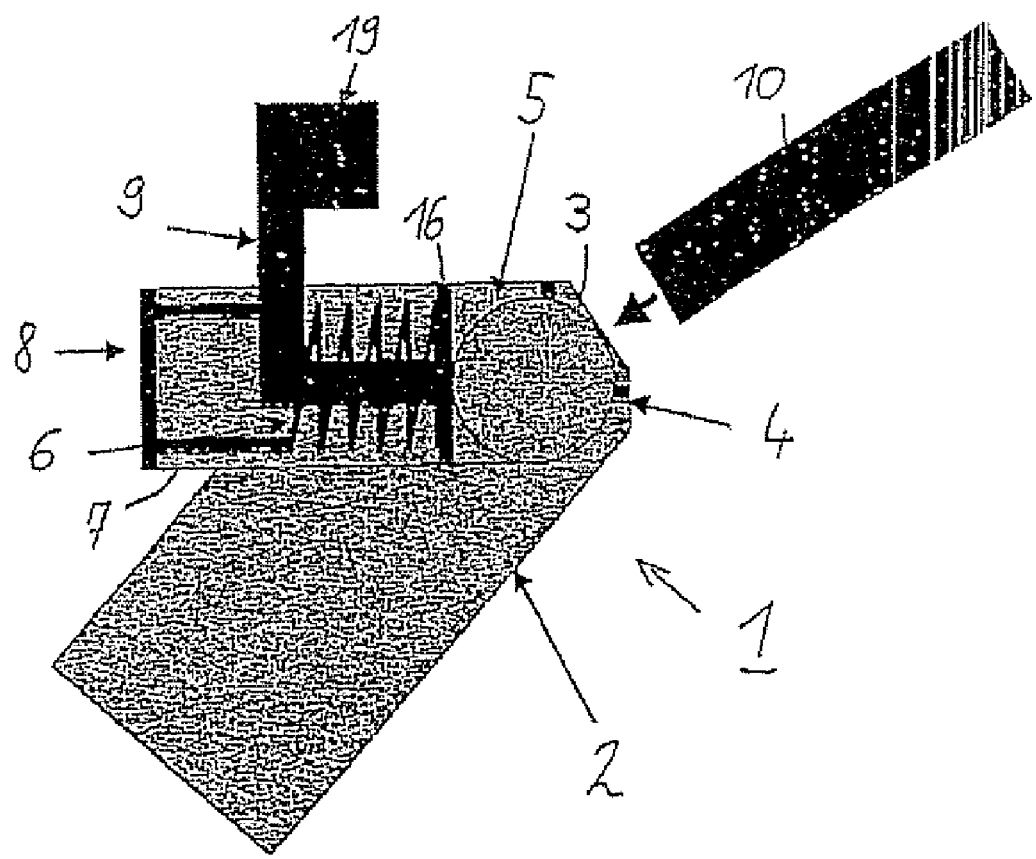
FIG. 1 shows a schematic representation of a sealing device in the sealing state.

FIG. 1 in a schematic representation shows a side view of a sealing device 1 of a fuel tank filler neck 2, which has a tank access opening 3. Arranged around the tank access opening 3 is a sealing ring 4, which takes the form of an O-ring. The tank access opening 3 is sealed by a ball 5, which is pressed against the seal 4 by a spring 6 and which seals the fuel tank filler neck 2 so that it is gas-tight.

The ball 3 is guided in a sleeve 7, which is sealed by a locking cap 8. The cap 8 serves to give access and serves for fitting the sealing device 1. The sleeve 7 is aligned at an acute angle $\alpha$ to the direction of insertion of a fuel nozzle 10 and hence to the longitudinal extent of the fuel tank filler neck 2, and on introduction of the fuel nozzle 10 causes a displacement of the ball 5 from the sealing position along the sleeve 7. The fuel tank filler neck 2 is thereby opened for refueling.

In FIG. 1 the spring 6 takes the form of a compression spring, which by way of a slide 16 loads the ball 5 in the direction of the tank access opening 3. The slide 16 is coupled to a rotatably supported lever 9, a counterweight 19, which in the event of an accident serves to hold the ball 3 in the closed position by compensating for mass acceleration forces, being situated at the end of the lever 9 opposite the slide 16.

For refueling, a fuel nozzle 10 is introduced into the tank access opening 3 and pressed against the ball 5, which is displaced along the sleeve 7 and opens a passage to the fuel tank filler neck 2. The inserted fuel nozzle 10 holds the ball 5 in an opened position against the spring pressure of the spring 6.

Figure 2:
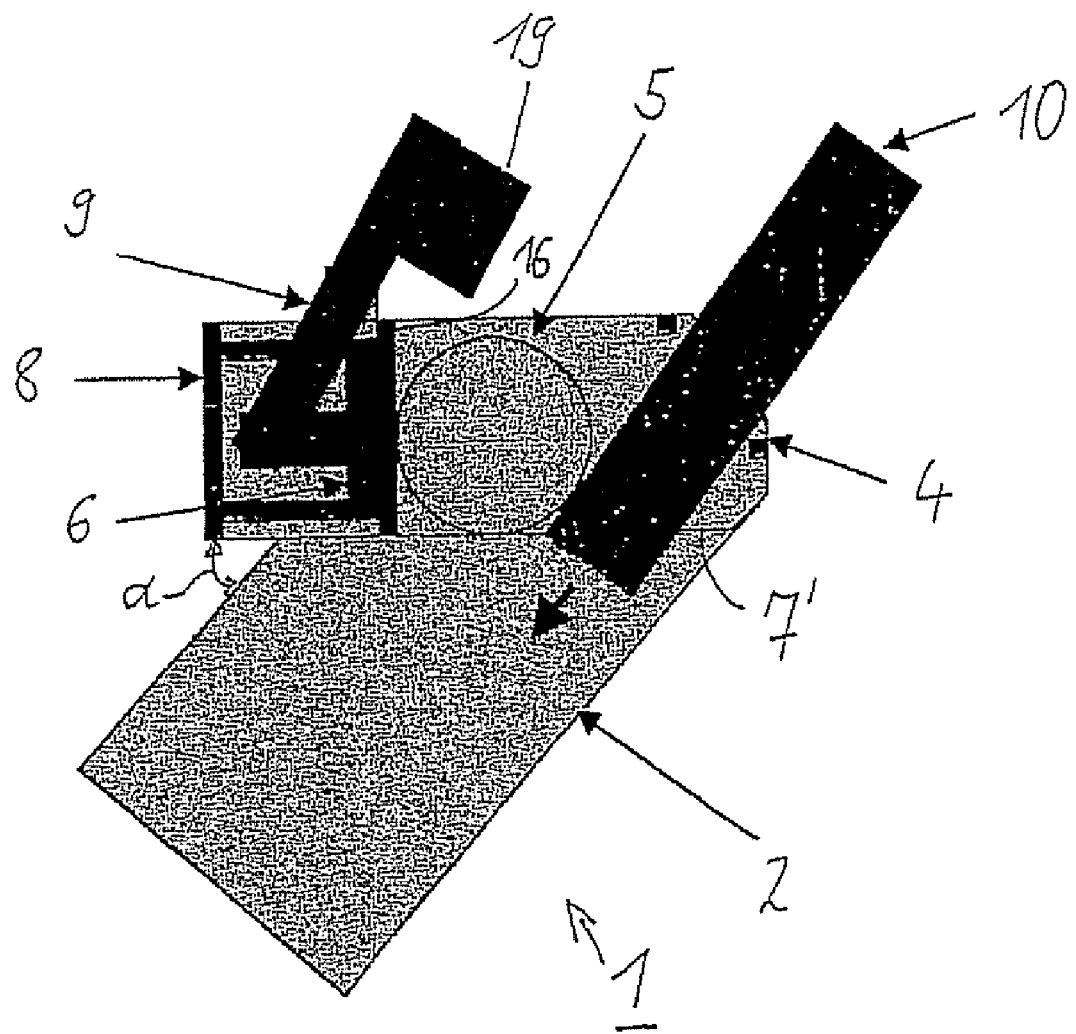
FIG. 2 shows a sealing device according to FIG. 1 in the refueling state.

This position, in which the fuel nozzle 10 is inserted through the tank access opening 3, is shown in FIG. 2. The compression spring 6 is compressed and the counterweight 19 is pivoted by the lever 9 in the direction of the fuel nozzle 10. In the area of the tank access opening 3 the sleeve 7 has a recess 7', through which the fuel nozzle 10 can pass, the passage opening 7' being smaller than the diameter of the ball 5.

On completion of the refueling process the fuel nozzle 10 is withdrawn from the fuel tank filler neck 2 and removed through the tank access opening 3. The spring 6 relaxes and presses the ball 5 along the sleeve 7 in the direction of the seal 4, and closes the tank access opening 3 so that it is gas-tight. The slowness of the movement involved in opening and closing the tank access opening means that the counterweight 19 exerts only a minimal action in opposition to a displacement force and therefore does not interfere with the refueling process.

The sealing device 1 advantageously takes the form of a module, which can be mounted on a fuel tank filler neck 2. The entire sealing device 1 represented can therefore be pre-assembled and mounted on a fuel tank filler neck 2 of a fitted fuel tank as part of the final assembly process.

The invention claimed is:

1. A sealing device comprising a tank access opening, including a guideway, a ball displaceably supported inside the guideway of the tank access opening in such a way that on insertion of a fuel nozzle into the guideway, the ball opens the tank access opening, wherein the guideway is aligned at an acute angle ($\alpha$) to the direction of insertion of the fuel nozzle, wherein the ball is acted up on by a force in the direction of the tank access opening, wherein the force is a weight or force storage device arranged on a lever.

2. The sealing device as claimed in claim 1, wherein the guideway is a sleeve.

3. The sealing device as claimed in claim 1, further comprising a sealing ring, against which the ball rests in a sealing position, the sealing ring being arranged at the access opening.

4. The sealing device as claimed in claim 1, wherein a diameter of the ball is greater than a diameter of the tank access opening.

5. A sealing device comprising a tank access opening a ball displaceably supported inside the tank access opening in such a way that on insertion of a fuel nozzle the ball opens the tank access opening a counterweight assigned to the ball to compensate for acceleration forces.

6. The sealing device as claimed in claim 5, wherein the counterweight is coupled to the ball by a lever.

7. The sealing device as claimed in claim 1, wherein the sealing device is a module fixable to a fuel tank filler neck.

8. A sealing device for a tank access opening as claimed in claim 1, wherein the tank access opening is a fuel tank filler neck in motor vehicles.

9. The sealing device as claimed in claim 2, wherein the sleeve includes a recess provided on an underside in a direction towards the tank access opening.

10. A sealing device comprising a tank access opening including a guideway, a ball displaceably supported inside the guideway of the tank access opening in such a way that on insertion of a fuel nozzle into the guideway, the ball opens the tank access opening, wherein the guideway is aligned at an acute angle to the direction of insertion of the fuel nozzle; said sealing device further comprising a slide which loads the ball in a direction of the tank access opening wherein the slide is coupled to a rotatably supported lever.

11. The sealing device as claimed in claim 10, further comprising a counterweight, situated at the end of the lever, opposite the slide.

12. A sealing device for a fuel tank filler neck, comprising:
a ball supported on a guideway, which is aligned at an acute angle to a longitudinal portion of the fuel tank filler neck;
a sleeve for guiding the ball, the sleeve having a recess provided on an underside of in a direction towards the fuel tank filler neck;
a sealing ring, against which the ball rests in the sealing position, is arranged at an access opening of the fuel tank filler neck;
means for applying a force upon ball; and
a counterweight assigned to the ball.

13. The sealing device for a fuel tank filler neck as claimed in claim 12, wherein the means includes a compression spring, a weight or force-storage devices arranged on a lever.

\* \* \* \* \*